United States Patent [19]

Jackson

[11] 4,291,962
[45] Sep. 29, 1981

[54] LENS MASK FOR CAMERAS AND PHOTOGRAPHIC METHOD

[76] Inventor: Thomas Jackson, 14580 Woodmont, Detroit, Mich. 48227

[21] Appl. No.: 163,785

[22] Filed: Jun. 27, 1980

[51] Int. Cl.³ .............................................. G03B 15/00
[52] U.S. Cl. .................................................... 354/122
[58] Field of Search ................ 354/120, 122, 125, 296

[56] References Cited

U.S. PATENT DOCUMENTS

| | | | |
|---|---|---|---|
| 678,490 | 7/1901 | Hug | 354/122 |
| 3,135,184 | 6/1964 | Siebenberg | 354/122 |
| 4,012,748 | 3/1977 | Lemanski | 354/122 |

Primary Examiner—John Gonzales
Attorney, Agent, or Firm—Cullen, Sloman, Cantor, Grauer, Scott & Rutherford

[57] ABSTRACT

In combination with a camera having a housing enclosing a film unit, a viewing window and a lens assembly including a normally enclosed shutter and a lens, a lens mask is removably mounted upon the lens assembly and includes an upright opaque end face which overlies and blocks one-half of the lens upon one side of a vertical plane passing through its optical axis. The image of a first object viewed from one side of the camera viewing window passes through the unmasked part of the lens and exposes one-half of the film unit. The mask is reversible to block the other one-half of the lens so that a second object viewed from the other side of the viewing window will expose the other half of the film unit.

Method which comprises masking one side half of a camera lens and positioning the camera with a first object centered within one side half of the viewing window and exposing the image upon one side half of the film unit. Method includes successively masking the other side half of the lens and positioning the camera with a second object centered within the other side of the viewing window and thereafter exposing the image of the second object onto the other side half of the film unit.

3 Claims, 15 Drawing Figures

U.S. Patent    Sep. 29, 1981    4,291,962
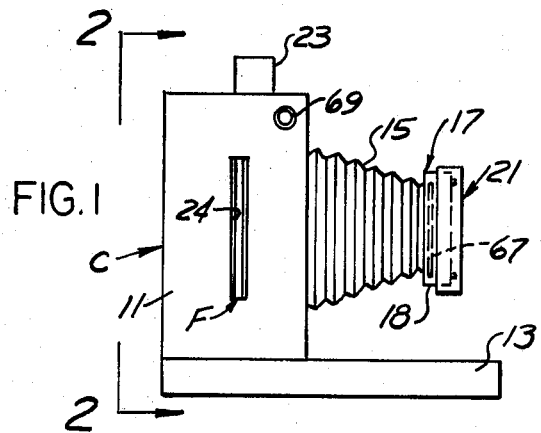
FIG. 1
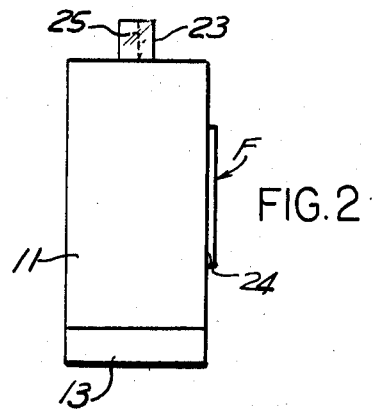
FIG. 2
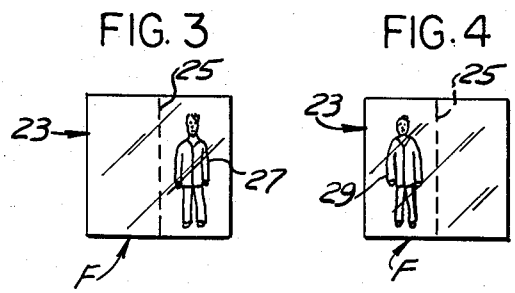
FIG. 3   FIG. 4
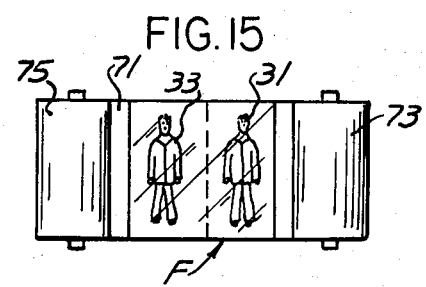
FIG. 15
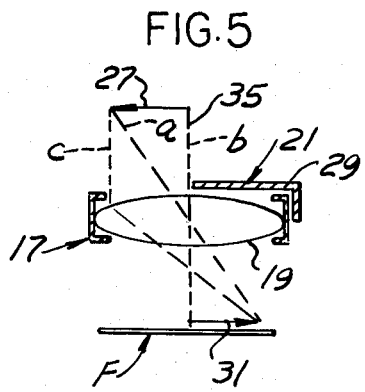
FIG. 5   FIG. 6
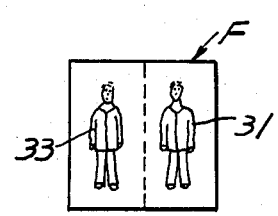
FIG. 7
FIG. 8
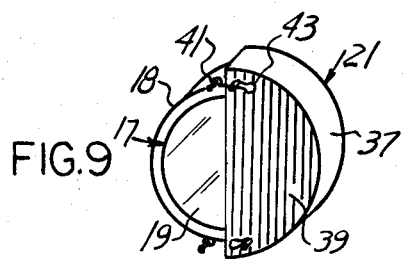
FIG. 9   FIG. 10
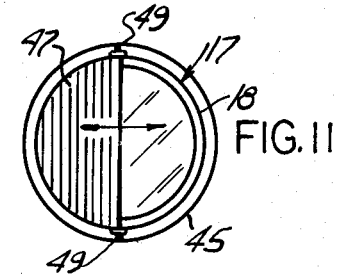
FIG. 11
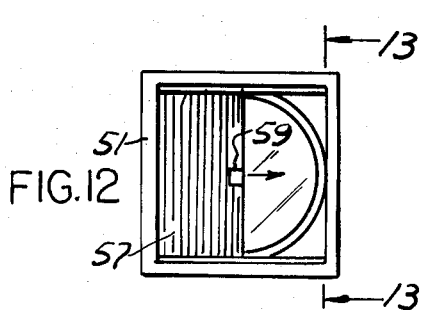
FIG. 12
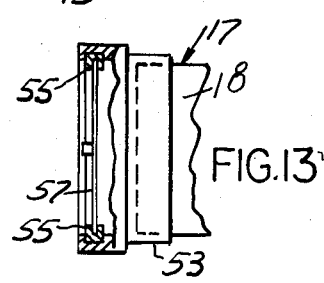
FIG. 13
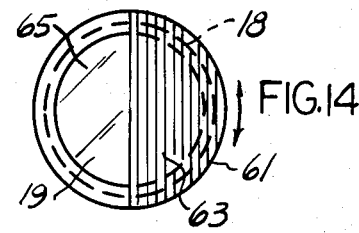
FIG. 14

LENS MASK FOR CAMERAS AND PHOTOGRAPHIC METHOD

BACKGROUND OF THE INVENTION

Heretofore cameras include a housing enclosing a film unit, a viewing window and a lens assembly which includes a normally closed shutter and a lens. A single object centrally positioned with respect to the viewing window as adapted to expose the corresponding image onto the film unit on momentary opening of the shutter. This is the conventional construction of the Polaroid Land type of camera employing a film pack which includes a series of stacked film units, or a more conventional camera having a roll of film units. Once the film unit has been exposed, the function of recocking the shutter control normally causes an automatic advancement of the film to the next film unit. In the case of Polaroid Land cameras, usually ejection of the exposed printed and developed film unit or its withdrawal from the camera housing is tied into the recocking of the shutter control mechanism. The primary purpose in cameras of both types is to avoid a double exposure onto a film before it has been advanced and after the initial exposure thereof. For each object exposed through the camera lens, there is a corresponding image exposed onto the film unit for subsequent developing and printing or for automatic development and printing as in the case of a Polaroid type of camera.

SUMMARY OF THE INVENTION

The primary feature of the present invention is to provide a lens mask which is removably mounted upon the lens assembly and which includes an opaque front face adapted to overlie and block one-half of the lens upon one side of a vertical plane passing through the optical axis. By using such mask, the image of a first object viewed from one side half of the viewing window and the shutter has been momentarily opened, passes through the unmasked part of the lens and exposes one-half of the film unit. A further feature of the present invention includes the successive reversing of the mask upon the lens assembly so as to block the other one-half of the lens whereby the image of a second object viewed from the other side half of the viewing window will pass through the unmasked part of the lens and expose the other one-half of the film unit.

In conventional cameras to avoid a double exposure, there is an automatic mechanism incorporated into the camera construction by which after the exposure of the film and the recocking of the shutter assembly, there is an automatic advancement of the film to the next adjacent film unit for subsequent exposure. An important feature of the present invention incorporates a means for bypassing the film advance mechanism until after the second exposure of the film unit.

A further feature includes by the use of the present mask, a means by which two objects which may be the same or different are independently viewed through first, one side half of the viewing window and with the lens mask provides for the exposure of the first object an image upon one-half of the film unit and wherein upon successively viewing of a second object through the viewing window upon the other side thereof and with the mask repositioned to cover the corresponding opposite side of the lens, there will be an exposure of the second object through the lens onto the other one-half of the film unit. This results in two spaced independent images applied to a single film unit.

Various types of masks may be provided to be mounted over the cylindrical housing which makes up a part of the lens assembly and including the lens and wherein in one position of the mask upon the lens assembly housing and upon viewing of a first object, through one side area of the viewing window, there will be an exposure of said object only upon one-half of the film unit and wherein without the successive advancement of the film unit, by placing the mask over the opposite side of the lens assembly and in positioning the camera so as to view a second object through the other half of the viewing window, the subsequent exposure of the second object, an image thereof is exposed upon the other side of the film unit. Accordingly, without the consequence of the conventional type of accidental double exposure of a film, there is in effect multiple exposures of the same or different objects providing a corresponding number of separate independent and spaced images exposed upon a single film unit.

An important feature of the present invention is a photographic method where in there is included the steps of masking one side half of a camera lens and thereafter positioning the camera housing with a first object centered within one side half of the area of a camera viewing window opposite from said mask, and thereafter exposing an image of the first object through the unmasked part of the lens onto one side half of the film unit within the camera. A further step includes the successive masking of the other side half of the camera lens and thereafter positioning the camera housing so that a second object is centered within the other side half of the area of the viewing window, thereafter the successive exposing of the image of the second object through the lens whereby the single film unit when developed, will have a corresponding number of objects spaced and imprinted thereon.

These and other features will be seen from the following Specification and Claims in conjunction with the appended drawing.

THE DRAWING

FIG. 1 is a schematic side view of one form of camera such as a Polaroid Land camera with the present lens mask applied thereto.

FIG. 2 is an elevational view taken in the direction of Arrows 2—2 of FIG. 1.

FIG. 3 is a front elevational view of the camera viewing window of FIG. 1, on an increased scale illustrative of the positioning of the camera housing so that a first object is viewed so as to be centered within one side area of the viewing window.

FIG. 4 is a similar view when the camera has been positioned so as to view a second object from the other side half of the viewing window and where in the respective object is schematically shown.

FIG. 5 is a schematic diagram illustrating the blocking function of the mask with respect to the lense, and transmission of the image of a first object through the unblocked portion of the lense for exposing the corresponding one-half of the film unit.

FIG. 6 is a similar view illustrating the mask repositioned over the other half of the lens illustrating the projection of a second object such as viewed in FIG. 4, its image exposing the other side of the film unit.

FIG. 7 is a schematic view of a single film unit which has exposed thereon the first and second images laterally spaced apart.

FIG. 8 is a bottom plan view of the film element of FIG. 6, diagrammatically illustrating the respective positioning of the images of the first and second objects upon the film unit shown in FIG. 7.

FIG. 9 is a fragmentary perspective view of one form of lens mask mounted upon the lens assembly so as to block off one side half of the lens.

FIG. 10 is a front elevational view of the lense assembly and mask, but with the mask rotated 180° from the position shown in FIG. 9.

FIG. 11 is a front elevational view of a modified mask having a rotatable end face, mounted upon a lens assembly.

FIG. 12 is a front elevational view of a modified mask construction which includes a mask slide adapted to selectively block one side or the other of the lens assembly.

FIG. 13 is a fragmentary side view taken in the direction of arrows 13—13 of FIG. 12.

FIG. 14 is a front elevational view of a modified mask.

FIG. 15 is a schematic elevational view illustrating a film unit as a part of a continuous film supported within the camera on a pair of spaced spools illustrating a pair of images exposed upon a single film unit.

It will be understood that the above drawing illustrates merely several embodiments of the present invention and that other embodiments and a corresponding method steps defined therein are contemplated within a scope of the claims hereafter set forth.

DETAILED DESCRIPTION OF OPERATIVE EMBODIMENTS OF THE INVENTION

Referring to the drawing, there is a schematic side elevational view in FIG. 1, of a camera C of the type sometimes referred to as a POLAROID LAND camera. The present invention is adapted to other types of cameras which include rolls of films mounted upon spools such as shown in FIG. 15, and is not limited to the specific type of camera.

The present camera includes an upright hollow housing 11 having a base 13, which may be pivotably connected to the housing, a flexible bellows 15, usually constructed of leather or plastic and terminating in a conventional lens assembly 17 which includes a tubular body 18, a normally closed shutter 67 with associated shutter control and a lense 19, FIGS. 5 and 6. Mounted upon the housing 11 is a conventional form of viewing window 23 through which the object to be photographed is usually sighted for proper registry with the lens for the conventional exposing of a film. Such film may be a film pack including a plurality of film elements F, FIGS. 5, 6 and 7, or a roll of film 71 extended between a pair of spools 73, 75 having a series of aligned film elements F, as in FIG. 15.

The present invention is directed to a lens mask 21 which is removably and adjustably mounted upon the lens assembly and specifically upon its tubular body 18. In the illustrative camera shown in FIGS. 1 and 2, corresponding to the conventional "POLAROID LAND CAMERA" there is provided upon one side of the housing a film outlet 24 through which the exposed and developed film is laterally projected. In some constructions the film element is manually pulled outwardly of the film outlet and in other cases it is automatically projected outwardly of the housing.

In accordance with the present invention, the film unit is designated at F which may be one of a series of a pack of film units such as is conventionally employed within the Polaroid Land type of camera. They are usually arranged in vertical planes and are normally at right angles to the optical axis of the lense assembly for successive exposures respectively.

The viewing window 23 may have central indicial line 25 which is a vertical medium line for dividing off the areas of the viewing window for use in sighting first object 27 as in FIG. 3, and successively sighting a second object 29 as shown in FIG. 4. For exposing the first object 27, FIG. 3, the camera housing 11 is manually held and so positioned for viewing object 27, through the viewing window. This is done through the right half area of window 23. Line 25 may be omitted from the viewing window.

In accordance with the present invention, for obtaining a second exposure on the same film element, the second object 29 viewed through the left hand portion of the viewing window 23, such as schematically shown in FIG. 4.

The exposing of two images into a single film element is accomplished with the use of the present lens mask 21 which has been applied over the lens assembly, as shown in FIG. 1 and schematically shown for example in FIG. 5 with one side of the lens masked.

The lens mask is of such construction as to include an opaque front or end face such as the face 39 in FIG. 9 which overlies and blocks one-half of the lens 19 upon one side of a vertical plane through its optical axis 35, shown schematically in FIG. 5.

In operation, the lens mask is mounted over the lens assembly so as to cover the adjacent one-half of the lens 19 and the first object is viewed through the right hand side of the viewing window 23.

The image of the first object 27 is transmitted essentially through the lens 19 as indicated by the dash lines a, b and c in order to provide image 31 exposed upon right hand side of the film element F of a proportional size, as is known in the art.

By bypassing the conventional film advance mechanism after such first exposure, retaining the film element stationary, the mask 21 is manually reversed so as to cover the opposite side half of the lens as shown in FIG. 6.

At that time object No. 2 as at 29, is viewed through the left side portion of the viewing window 23 as shown in FIG. 4, so that the second object is in proper registry with the lens and so that the image thereof as shown at 33 is transmitted through the lens as by the dash lines a and b, for illustration so that the image 33 exposes the left side portion of the film element F.

The resulting picture, from the film element F is schematically shown in FIG. 7. Two images 31 and 33 are printed thereon whether it be a Polaroid Land camera type of film or the conventional roll of film shown in FIG. 15.

The schematic plan view FIG. 8 designates the position of the respective developed or printed images 31 and 33 upon and with respect to the single film unit F.

Conventional cameras usually employ with the recocking of the shutter control means for automatically advancing the film so as to present a new film element into registry with the optical axis of the lens assembly, thus avoiding double exposure of a particular film element.

Since the present invention contemplates with the use of the present mask, application of at least two images upon a single film element, it is required in the operation of the present camera using this lens mask that subsequent to the first exposure and until after the second exposure, there is a bypass of a film advance mechanism such that the film element F remains stationary until after the second exposure thereon.

Since the present invention is directed primarily to the use of a mask as defined specifically herein, not to the camera construction, suffice to say that the detail of construction of the shutter construction as at 67, and the control therefore has been omitted as being a conventional construction. The only requirement is that with the recocking of the shutter as is required for the temporary exposure thereafter as desired, the film will not be automatically advanced until there has been the second exposure upon a individual film element as above described.

Specific construction of the present lens mask are shown in FIGS. 9-14, each of which will accomplish the desired result.

Accordingly, using the present mask, the image of the first object sighted through, one side half of the viewing window will pass through the unmasked part of the lens and expose one-half of the film unit. The mask thereafter is successively reversed upon the lens assembly, so that its opaque end face overlies and blocks the other half of the lens 19. The image of a second object sighted through the other side half of the viewing window will pass through the unmasked part of the lens and expose the other half of the film unit. This is shown schematically in FIGS. 5 and 6, and in the final printed film unit F, FIG. 7.

Various means are employed for retaining the mask upon the lens assembly. The primary objective is that in one position the mask will cover and block one-half of the lens upon one side of the vertical plane through its optical axis. In a second position of the mask when adjusted and remounted upon the lens assembly, its opaque end face will overlie and block the other one-half of the lens.

Referring to FIG. 9, the lens mask 21 includes a semi-cylindrical body 37 having a semi-circular opaque front face 39, which is removably mounted upon the lense assembly 17 so as to overlie and block one-half of the lense upon one side of a vertical plane through its optical axis. Vertically spaced pairs of laterally spaced headed pins 41 project forwardly of the lens assembly tubular body 18. At one time one pair of vertically spaced headed pins project through corresponding bayonette slots 43 formed at the top and bottom of end face 39.

This positioning of the lens mask corresponds to the blocking of the left side of the lens as shown schematically in FIG. 6.

After the first exposure, the mask is reversed to the position shown in FIG. 10 and wherein its end face 39 blocks the other half of the lens assembly and the lens 19 therein such as shown schematically in FIG. 5. The rotated mask is held in place by the respective headed pins 41 within the corresponding bayonette slots 43. Thus, in both positions of the mask in FIGS. 9 and 10, its opaque end face overlies and blocks one-half of the lens 19 on one side of the other of a vertical plane through its optical axis.

A modified mask is shown in FIG. 11 and includes a cylindrical housing 45 mounted on tube 18. Gate 47 of semi-circular shape in the form of a swing gate is pivotally mounted at its top and bottom as at 49 on a vertical axis so as to be manually positioned either in the blocking position shown in FIG. 11 upon one side of the lens, or on the opposite side thereof such as demonstrated in FIG. 9.

A modified mask is shown for the lens in FIG. 12, which includes a mask housing 51 of rectangular shape and rearwardly thereof a cylindrical adapter 53 adapted to cooperatively overlie a portion of the tubular body 18 forming a part of the lens assembly 17, FIG. 13.

Within the housing 51, at the top and bottom thereof are a pair of opposed U-shaped channel guides 55 adapted to slidably support and receive the mask slide 57 which is generally of rectangular shape FIG. 12. A handle 59 is applied to one side of the mask slide so that after the first exposure, through one-half of the lens, the mask slide may be advanced laterally to the right hand position from that shown in FIG. 12 so as to mask the other side of the lens for the second exposure upon the same film element.

A modified mask is shown in FIG. 14 which includes a cylindrical housing 61 having a forward opaque end face 63 of a semi-circular shape which in the position shown, overlies and blocks one-half of the lens upon one side of a vertical plane passing through the lens optical axis. In this case for the second exposure and without advancing the film element, mask housing 61 is merely rotated 180° upon tube 18 so as to cover the other side of the lens. As shown in FIG. 14 formed within the front portion of the lens housing corresponding to the opaque semi-circular front face 63, is the opening 65 of semi-circular shape adapted for transmitting the image of the first object or the second object respectively through the lens assembly.

The shutter assembly for the camera, regardless of what type of construction is schematically shown at 67, includes connected thereto by some form of a conventional shutter control as designated at 69, FIG. 1, by which the shutter is recocked after exposure ready for the next exposure. Contrary to conventional constructions where the recocking of the shutter causes an automatic advance of a film element, in this particular case, the automatic advance of the film element is bypassed and does not occur until there has been a second exposure of the second object upon the second portion of the film element.

The foregoing description also applies to the use of a mask with a conventional camera of the type wherein a roll 71 of film elements FIG. 15, F is supported and mounted upon and between a pair of spools 73 and 75 conventionally journaled upon vertical axes which are spaced apart for the purpose of presenting a single film element F in registry with the optical axis 35 in a conventional manner.

FIG. 15 schematically shows such film element on to which there has been exposed images 1 and 2 from their respective objects 31 and 33 achieved in the photographic method defined above.

Accordingly, the present invention contemplates the use of a lense mask which when applied to the lens, includes an opaque end face of such shape and construction so as to overlie and to block one-half of the lens upon one side of a vertical plane through its optical axis for an initial exposure.

The present invention contemplates the photographic method which includes the steps of:

1. Masking one side half of a camera lens;
2. Positioning the camera housing with a first object centered within the one side half of the camera of the camera viewing window opposite from said mask;
3. Exposing the image of said object through the unmasked part of said lense upon one side half of the film element within the camera;
4. Successively, masking the other side half of the camera lens;
5. Positioning in a the camera housing with the second object centered within the other side half of the area of the viewing window;
6. Successively exposing the image of the second object through the unmasked part of said lens onto the other side half of the film element within the camera, whereby the single film element when developed will have both objects spaced and imprinted thereon.

Having described my invention, reference should now be had to the following claims.

I claim:

1. In the combination with a camera having a housing enclosing and mounting a film unit, a viewing window and a lens assembly including a normally closed shutter and a lens;

a lens mask removably and adjustably mounted upon said lens assembly, including an upright opaque end face overlying and blocking one-half of the lens upon one side of a vertical plane through its optical axis;

whereby the image of a first object sighted through one side half of the viewing window will pass through the unmasked part of said lens and expose one-half of said film unit;

said lens assembly including a tube on said housing enclosing said lens;

said lens mask including a semi-cylindrical body mounted upon said tube, said end face being mounted upon one end of said body and semi-circular in shape; and laterally spaced pairs of vertically spaced headed pins on and extending forwardly of said housing there being a pair of bayonet slots formed adjacent to the top and bottom of said end face cooperatively receiving one pair of said pins.

2. In the combination of claim 1, said mask being successively reversible upon said lens assembly, with its end face overlying and blocking the other one-half of the lens, whereby the image of a second object sighted through the other side half of the viewing window will pass through the unmasked part of said lens and expose the other half of said film unit, said bayonet slots receiving one pair of said pins.

3. In the combination with a camera having a housing enclosing and mounting a film unit, a viewing window and a lens assembly including a normally closed shutter and a lens;

a lens mask removably and adjustably mounted upon said lens assembly, including an upright opaque end face overlying and blocking one-half of the lens upon one side of a vertical plane through its optical axis;

whereby the image of a first object sighted through one side half of the viewing window will pass through the unmasked part of said lens and expose one-half of said film unit;

said lens assembly including a tube on said housing enclosing said lens;

said lens mask including a semi-cylindrical body mounted upon said tube, said end face being mounted upon one end of said body and semi-circular in shape; and a pair of vertically spaced headed pins on and extending forwardly of said housing;

there being a pair of bayonet slots formed adjacent to the top and bottom of said end face cooperatively receiving said pair of pins, said mask being successively reversible upon said lens assembly with its end face overlying and blocking the other half of the lense, said pair of bayonet slots within said end face cooperatively receiving said pair of pins.

* * * * *